United States Patent

Powers et al.

[15] 3,660,160

[45] May 2, 1972

[54] DISSOLUTION OF POLYMERS

[72] Inventors: Kenneth W. Powers, Berkeley Heights; George E. Serniuk, Roselle, both of N.J.

[73] Assignee: Esso Research and Engineering Company

[22] Filed: Dec. 31, 1969

[21] Appl. No.: 889,697

[52] U.S. Cl. ..........................134/22, 23/312 A, 134/38, 134/42, 252/162, 252/364, 252/DIG. 8, 260/85.3, 260/94.9 GC, 260/96 D
[51] Int. Cl. ....................B08b 7/00, B08b 9/00, C23g 5/00
[58] Field of Search ..............134/42, 22, 38; 252/142, 162, 252/364, DIG. 8, 188.3, 189; 106/311; 260/85.3, 94.9 GC, 96 D, 705; 23/312 A

[56] References Cited

UNITED STATES PATENTS

| | | | |
|---|---|---|---|
| 3,558,589 | 1/1971 | Bethea et al. | 260/96 D X |
| 3,423,323 | 1/1969 | Hunter et al. | 252/162 X |
| 2,749,313 | 6/1956 | Williams et al. | 134/38 X |
| 3,426,007 | 2/1969 | Kennedy | 260/85.3 |
| 3,560,458 | 2/1971 | Kennedy et al. | 260/85.3 |
| 3,560,459 | 2/1971 | Kennedy | 260/85.3 |

*Primary Examiner*—Joseph Scovronek
*Attorney*—Chasan and Sinnock and Harold Einhorn

[57] ABSTRACT

Dissolution of cross-linked polymer gels is effected by use of Lewis acids plus Lewis salts.

14 Claims, No Drawings

DISSOLUTION OF POLYMERS

This invention relates to a novel process for dissolving polymers. More specifically, it relates to a process for dissolving an insoluble polymer gel of butyl rubber.

BACKGROUND OF THE INVENTION

As is well known to those skilled in the art, butyl rubber, including halogenated butyl rubber, may be prepared by carrying out various reactions within a reaction vessel. Typically, the reactions may be carried out over an extended period of time at ambient to very low temperatures and ambient to somewhat elevated pressures.

During the course of the reaction, a film of polymer tends to coat out on the heat transfer surfaces within the reactor; and as the film builds up in thickness, it interferes with heat transfer and eventually necessitates shutting down the reactor for cleaning. In typical butyl rubber polymerization reactions, most of the deposited polymer is hydrocarbon-soluble and can be removed by washing with hot solvent such as hexane, toluene, aliphatic solvents, etc.; and after washing, the reactor can be put back into service. It is well known to those skilled in the art that commercial butyl reactors must be so cleaned after 15 – 60 hours of operation; and such a working cycle is commonly provided.

However, there may also be formed during the polymerization a small amount of a cross-linked, reticulated, insoluble polymer or gel; and this gel polymer may coat out on the heat transfer surfaces. This gel polymer is insoluble in solvents and cannot be removed during the washing cycles commonly employed.

These problems may be particularly severe in the polymerization of high unsaturation butyl rubber (having 2.5 to 3 mole percent unsaturation) or butyl rubber containing branching agents (such as divinyl benzene or 2,5-dimethyl-1,5-hexadiene); and a significant amount of gel polymer may be deposited. Solvent washing of the reactor is not sufficient to keep the reactor in service for extended periods. The deposition of gel polymer, under certain conditions of polymerization, can be unusually heavy as in the production of low molecular weight butyl rubber, typically having at least 3 mole percent unsaturation.

Prior art practices have attempted to remove this film by variety of chemical techniques, but none of these techniques has been found to be commercially satisfactory. Accordingly, the insoluble gel within the reactors has been commonly removed by shutting down the reactor and manually scraping the gel film from the heat transfer surfaces. As in clear to those skilled in the art, this technique is costly and time consuming — requiring extended periods of shutdown and a high labor cost for removal of the gel polymer.

It is an object of this invention to provide a process for dissolving polymer gel. It is a further object of this invention to effect ready cleaning of reaction vessels by the removal therefrom of polymer gels deposited therein during polymerization to form butyl rubber polymer. Other objects will be apparent to those skilled in the art from inspection of the following description.

SUMMARY OF THE INVENTION

In accordance with certain of its aspects, the method of this invention for dissolving an insoluble butyl rubber gel may comprise:

a. contacting said gel with a solution of a catalyst composition including a Lewis Acid catalyst and a Lewis salt cocatalyst thereby solubilizing at least a portion of said gel and forming a catalyst sludge;

b. separating said solution and said solubilized gel from a major portion of said catalyst sludge;

c. contacting said major portion of said catalyst sludge with a polar solvent thereby dissolving said major portion of said catalyst sludge and forming a polar solution; and d. withdrawing said polar solution.

DESCRIPTION OF THE INVENTION

The gels which may be dissolved by the novel process of this invention may be those insoluble, cross-linked polymer gels deposited, for example, upon the internal surfaces, including heat transfer surfaces, of reaction vessels in which polymers such as butyl rubber polymers may be prepared. Butyl rubber is a copolymer of isobutylene with a small amount of isoprene. Typically, butyl rubber may be prepared by polymerizing a mixture of isobutylene containing 1.5 percent to 4.5 percent isoprene, in a methyl chloride diluent. Catalyst may include anhydrous aluminum chloride dissolved in methyl chloride. Reaction may be carried out typically at −95° C. To yield polymers in the form of a slurry which may be pumped out of the reaction vessel continuously as monomer and catalyst are added.

It may be found that during the preparation of butyl rubbers, gels may be found which are particularly difficult to remove from reactor surfaces when, for example:

a. The product butyl rubber is characterized by a high degree of unsaturation;

b. The reaction mixture contains branching agents;

c. the reaction mixture contains small amounts (e.g. 0.1 percent on isobutylene) of divinyl benzene or 2,5-dimethyl-1,5-hexadiene;

d. The product is a low molecular weight butyl rubber, containing greater than 3 percent isoprene, prepared in hexane or propane diluent at reaction temperature of e.g. −60° C.; etc.

The butyl rubbers which fall within the scope of the instant invention include halogenated butyl rubbers, i.e. chlorobutyl rubbers, bromobutyl rubbers, etc. Typically these halo-butyl rubbers may be prepared by halogenation butyl rubber dissolved in e.g. aromatic or aliphatic solvents or chlorinated solvent.

At the completion of the polymerization reaction which produces the butyl rubber, it will be observed that there may be deposited within the reaction vessel and on the heat transfer surfaces an insoluble butyl rubber polymer gel which cannot be removed by the typical solvent washing techniques. Typically, this gel may be cross-linked and characterized by substantial insolubility in solvents. The viscosity average molecular weight of the deposited gel may typically be greater than $1 \times 10^6$ and it can usually not be measured, in contrast to the typical corresponding viscosity average molecular weight of 20,000 to 600,000, say 400,000, of the butyl rubber polymer prepared during the reaction.

In accordance with this invention, the cross-linked insoluble gel may be contacted with a solution of a catalyst composition, including a Lewis acid catalyst and a Lewis salt cocatalyst. The solution may be a hydrocarbon solution or a hydrocarbon halide such as methyl chloride or chlorobenzene. In some embodiments, the solution may be formed by dissolving the Lewis acid, e.g. aluminum chloride, in Lewis salt, e.g. t-butyl chloride. Preferably, the solution may be a hydrocarbon solution; and typically the hydrocarbon may be an aliphatic or aromatic hydrocarbon, preferably having a boiling point of 10° C. to 500° C., say 100° C. Typical aliphatic hydrocarbons which may be employed may be hexane, pentane, heptane, cyclohexane, and 2-methyl pentane. Typical aromatic hydrocarbons which may be employed include benzene, toluene, xylene, cumene, and mesitylene. It is preferred that the hydrocarbon be an aliphatic hydrocarbon and, most preferably, hexane. In commercial practice, it is preferred that the hydrocarbon be the same hydrocarbon as that in which the polymerization reaction may be carried out. It will be apparent that it may be possible that the diluent-solvent, e.g. methyl chloride, may serve as the Lewis salt cocatalyst.

The Lewis acid which, in the preferred embodiment, may be in solution in the hydrocarbon and which forms the first portion of the catalyst composition may be a compound which can function as an electron acceptor and which may serve to attack the residual double bonds within the butyl rubber gel structure, protonating or alkylating the structure to form a stable carbonium ion which decomposes, i.e. causes scission of the chain, thereby breaking the gel chain down from its initial viscosity average molecular weight of greater than $1 \times 10^6$ to immeasurable, to a final lower value of 1,000 to 100,000, say 20,000.

A Lewis acid may take up an electron pair to form a coordinate bond or the electrons may actually occupy an orbital of the metal. A Lewis acid, as the term is used herein, does not normally include acids as defined either by the classical Ostwald-Arrhenius definition (i.e. a substance that gives rise to hydrogen ions in aqueous solutions) or by the Bronsted definition (i.e. a substance which can give up protons). In most cases, the Lewis acid may not normally contain hydrogen and, in those instances where it does, e.g. $B(CH_3)_3$, the ability to serve as a Lewis acid is not dependent thereon, but rather upon the ability of the "central" atom to accept an unshared electron pair. Commonly (i.e. under the Ostwald-Arrhenius definition or under the Lowry-Bronsted definition) Lewis acids are not thought of as acids, but rather as neutral compounds. In common parlance, a Lewis acid reacts to form a "-complex" by "addition," whereas a Bronsted acid, for example, reacts by losing a proton.

Typical of the Lewis acids which may be employed in practice of this invention may be the following:

1. Organometal compounds $R_aMX_b$ wherein M may be a metal of Group IIIA and IVA of the Periodic Table having a valence of $a + b$, X may be an anionic moiety, typically halogen, preferably chlorine, and R may be a hydrocarbon residue selected from the group consisting of Alkyl, aryl, cycloalkyl, alkaryl and aralkyl. When R is alkyl, it may be methyl, ethyl, propyl, i-propyl, n-butyl, i-butyl, t-butyl, hexyl, cyclohexyl, octyl, etc. When R is aryl, it may be phenyl, naphthyl, etc. When R is alkaryl, it may be tolyl, xylenyl, etc. When R is aralkyl, it may be benzyl, β-phenyl etc. The R group may be inertly substituted, i.e. it may bear a substituent which does not react with the other components of the process or interfere with the reaction. Typical inert substituents may include halogen, aryl, alkyl, etc. Typical inertly substituted R radicals may include chlorophenyl, 2-ethyl-hexyl, methylcyclohexyl, 4-chloro-3-butyl, etc. All the R groups in a particular compound need not be the same; preferably, however, they may be the same. Preferably, R may be alkyl and, more preferably, lower alkyl having one to 10 carbon atoms.

Preferably, M may be aluminum or tin and in the preferred embodiment it may be aluminum. The preferred compounds may thus be $R_aAlX_b$, where each of a and b may equal one or two. The preferred organoaluminum compounds which may be employed in practice of the process of the invention may typically be ethyl aluminum dichloride and diethyl aluminum chloride.

2. Metal compounds $Y_b$, wherein M' is a metal preferably selected from Groups IVA and IVB of the Periodic Table, preferably tin and titanium and b is the valence of M'; preferably b is four. Y may be halogen, preferably chlorine. The preferred Lewis acid catalysts in this category may include tin tetrachloride $SnCl_4$, titanium tetrachloride $TiCl_4$, zirconium tetrachloride $ZrCl_4$, tin tetrabromide $SnBr_4$, titanium tetrabromide $TiBr_4$, etc. Other Lewis acids may include $AlBr_3$, $AlCl_3$, $FeCl3$, $SbCl_3SbCl_5$, $BiCl_3$, $BiCl_5$, $AsCl_3$, $ZnCl_2$, $ZnBr_2$, $CdCl_2$, $CuCl_2$, $HgCl_2$, $HgBr_2$, $TiCl_4$, $TiBr_4$, $GaBr_3$, $ZrCl_4$, $TaCl_5$, $NbCl_4$, $TeCl_2$, $TeBr_4$, $MoBr_4$, $WBr_5$, etc.

3. Halogen compounds of non-metals capable of accepting an electron pair and commonly having the formula $AX_c$ wherein A is a non-metal, preferably boron, X is halogen, preferably fluorine, and c is the valence of the non-metal A. Typical compositions may include boron trichloride, phosphorus trichloride, phosphorus tribromide, etc. The preferred composition in this category may be boron trifluoride, $BF_3$, preferably used in the form of a solution of its etherate.

It will be apparent to those skilled in the art that mixtures of these Lewis acid catalysts may be employed; preferably, however, only one Lewis acid catalyst may be employed in any specific aspect of the process. The preferred Lewis acid catalyst may be ethyl aluminum dichloride.

The Lewis salts, which may be employed as cocatalysts in the process of this invention, may be formed by the reaction between a base and a Lewis acid which is weaker than the Lewis acid used as catalyst. It appears that during the reaction, the strong Lewis acid of the catalyst may react with the Lewis salt to displace therefrom a nascent weaker Lewis acid which then attacks the double bonds within the butyl rubber gel to cause chain scission. Typical of such a system may be that utilizing as Lewis salt, the compound RCl, which may react with strong Lewis acid $RAlCl_2$ to yield $RAlCl_3^-$ and weaker Lewis acid $R^+$.

Typical of the Lewis salt cocatalysts which may be employed may be the following:

a. Hydrocarbon halides such as alkyl (including substituted alkyl) halides, e.g. benzyl chloride, t-butyl chloride, allyl bromide, chlorobenzene, etc.

b. Hydrogen halides such as hydrogen chloride, hydrogen bromide, etc.

c. Organic acids including acetic acid, benzoic acid, trichloroacetic acid, dichloroacetic acid, monochloroacetic acid, etc.

The Lewis salt may typically be a Bronsted Acid (also more properly called a Lowry-Bronsted Acid) which may be a substance which can give up or lose a proton in a particular reaction, i.e. a Bronsted Acid contains hydrogen and is a proton donor. The more common of the Bronsted acid may include the common mineral acids or organic acids. Typical of the compositions which may be employed as Bronsted Acids in the process of this invention may be organic acids, including, e.g. acetic acid, maleic acid, succinic acid, trichloroacetic acid, phosphoric acid, etc.

Where either the Lewis acid or the Lewis salt, or both, is a liquid and the Lewis acid and the Lewis salt are inter-soluble, the catalyst composition may consist essentially of the Lewis acid and the Lewis salt. However, it may be generally desirable to dissolve both the Lewis acid and the Lewis salt in a solvent, typically a hydrocarbon solvent to form a hydrocarbon solution.

Typically, the preferred hydrocarbon solution may contain for each 100 parts of hydrocarbon, 0.01 to 10 parts, say 2 parts of Lewis acid catalyst and 0.00001 to 1 part, say 0.04 parts of Lewis salt cocatalyst. Hydrocarbon solution typically containing total catalyst composition in amount of 0.01 to 11 parts, say 2 parts, per 100 parts of hydrocarbon may be employed. A preferred solution may contain 2 parts of ethyl aluminum dichloride Lewis acid catalyst and 0.04 parts of benzyl chloride Lewis salt cocatalyst in 100 parts hexane hydrocarbon.

In practice of this invention, the solution of the catalyst composition in the hydrocarbon, preferably at a temperature of $-20°$ C. to $400°$ C., say $20°$ C., may be added to the insoluble butyl rubber polymer gel which is to be dissolved. Commonly, the hydrocarbon solution may be added to the vessel to a height sufficient to cover at least the fouled heat exchanger surfaces.

The process may be carried out by utilizing a solution at $-20°$ C. to $400°$ C., say $20°$ C. for a period of 1 to 60 minutes, say 30 minutes, and preferably agitating the solution. As the solution is maintained in contact with the insoluble polymer gel, the latter may be broken down and at least a portion solubilized. In typical operation, substantially all of the insoluble polymer gel may be broken down and solubilized. Commonly, over the period of operation, substantial portions of the gel may be solubilized, typically amounts greater than 90 percent thereof and commonly amounts approaching the stoichiometric 100 percent — even after periods as brief as 15 minutes. During dissolution of the gel, there may be formed a catalyst sludge which may be derived from the byproduct of the reactions between the catalyst composition and the gel; and this sludge may deposit on the surfaces within the reaction vessel as the gel is removed therefrom.

After the contact time of 1 to 60 minutes, say 30 minutes, it may be found that the solution contains a composition typically having a viscosity average molecular weight of 1,000 to 100,000, say 20,000 in contrast to the high viscosity average molecular weight (greater than $10^6$ and frequently so high as to be unmeasurable) of the initial insoluble gel.

The solution containing the solubilized gel may then be separated from the catalyst sludge as by pumping the solution from the reaction vessel.

In practice of the process of this invention, the catalyst sludge may then be contacted with a polar solvent, thereby dissolving the catalyst sludge and forming a polar solution. A polar solvent in accordance with the practice of this invention may be one which is characterized by a molecule having a substantial electric dipole i.e. equal to greater than 1.0 Debye units) and/or a cohesive energy density greater than 8.0. Typically, polar solvents may be oxygenated hydrocarbons including:

a. Alcohols including methanol, ethanol, isopropyl alcohol, amyl alcohol, etc.;
b. Ketones including acetone, methyl ethyl ketones, etc.;
c. Aldehydes including formaldehyde, acetaldehyde, etc.; and
d. Solutions of acids including hydrochloric acid, acetic acid, etc., in water, in ether, in hydrocarbons, etc.

Other illustrative types of polar solvents may include nitro-compounds such as nitro-propane, ethers such as dioxane, hydroxy esters such as ethyl glycollic acid, amines such as diethanolamine, monoethanolamine, sulfoxides such as dimethyl sulfoxide, diethyl sulfoxide, sulfides such as diethyl sulfide, etc.

The preferred amount of polar solvent employed may be 5 to 75, say 25 parts, per 100 parts of hydrocarbon. The preferred polar solvent may be 95 percent ethyl alcohol. The catalyst sludge may be contacted with the polar solvent for a period of 1 to 60 minutes, say 15 minutes, at a temperature of $-20°$ C. to $40°$ C., say $20°$ C., preferably with agitation. During contact of the catalyst sludge with the polar solvent, the sludge may dissolve to form a polar solution containing typically 0.01 to 5 parts, say 1 part, of sludge per 100 parts of polar solvent.

The polar solution containing the catalyst sludge may then be withdrawn from the reaction vessel. If desired, the reaction vessel may be further flushed by addition thereto of polar solvent to remove last traces from the reaction vessel of said sludge and then rinsed with a hydrocarbon solvent. At this point it will normally be found that the reaction vessel may be substantially clean and free of fouling by the insoluble butyl rubber gel. The reaction vessel may then be placed back in service to prepare further quantities of desired butyl rubber.

Practice of the novel process of this invention may be further understood by reference to the following examples wherein, as elsewhere in this specification, all parts are parts by weight unless otherwise specifically set forth.

DESCRIPTION OF PREFERRED EMBODIMENTS

EXAMPLE I

In accordance with a preferred embodiment of this invention, a gel was obtained from a 100 gallon commercial reactor in which a butyl rubber had been prepared continuously by reacting 100 parts of isobutylene and 8 parts of isoprene at $-56°$ C. and atmospheric pressure with a residence time of 40 minutes in the presence of 150 parts of propane solvent and 1.1 parts of ethyl aluminum dichloride catalyst and 0.02 parts benzyl chloride cocatalyst. The reactor was used for 120 hours at which time the heat transfer surfaces were observed to be fouled. The reactor was continuously flushed with 300 gallons of hexane at $20°$ C. over 2 hours dissolving all the soluble polymer and volatiles and leaving a film of polymer gel.

After heating the reactor to $27°$ C., 11 gallons of a 20 percent solution of ethyl aluminum dichloride Lewis acid in hexane was added to the hexane in the reactor to bring the ethyl aluminum dichloride concentration in the reactor to 2 percent. 0.44 gallons of 10 percent solution of benzyl chloride Lewis salt in hexane was then added, the total amount of benzyl chloride added being 2 percent of the ethyl aluminum dichloride.

The reactor contents were agitated for 15 minutes at $27°$ C. during which time the gel film was solubilized and removed from the reactor surfaces being replaced by a sludge which formed and settled. The contents of the reactor were then withdrawn; and the reactor filled with fresh hexane at $20°$ C. to flush out residual hexane-soluble products. Fifteen parts of 95 percent ethanol per 100 parts of hexane in the reactor were then added to the reaction vessel. After agitation at $20°$ C., it was found that the sludge was solubilized and the alcohol and sludge were withdrawn.

Inspection of reactor internals revealed that they were clean and free of polymer gel.

EXAMPLE II

In this example, a sample of the polymer gel (left in the reactor after the reaction described in the first Paragraph 1 of Example I) was scraped from the reactor surfaces. 10 parts of this gel was added to a mixture of 0.5 parts of diethyl aluminum chloride (Lewis acid catalyst) and 0.01 parts of benzyl chloride (Lewis salt cocatalyst) in 100 parts of n-hexane. The mixture was heated to $20°$ C. and maintained there for 15 minutes. At the conclusion of the reaction, the contents of the flask contained a sludge and upon analysis it was found that greater than 99 percent of the polymer gel had been solubilized in the hexane. Analysis revealed that the solubilized material had a viscosity average molecular weight $\overline{M}v$ of 1,225 (the charge gel had an immeasurably high molecular weight).

Upon decanting the liquid in the flask and addition to the flask of 100 parts of 15 percent ethanol in hexane at $20°$ C., it was observed that the remaining sludge was dissolved on addition of the ethanol.

EXAMPLE III

In this control example, the procedure of Example II was duplicated except that the benzyl chloride Lewis salt was omitted; and the mixture was heated for 24 hours instead of 15 minutes. It was undesirably found that only 75 percent of the gel was solubilized and this product showed a molecular weight $\overline{M}v$ of 21,000.

EXAMPLE IV

Further illustrative examples which show systems which may be employed may use the following catalyst, cocatalyst, and polar solvents:

| Example | Catalyst | Cocatalyst | Polar solvent |
|---|---|---|---|
| IV | $AlCl_3$ | Isopropyl fluoride | Methyl ethyl ketone. |
| V | $BF_3$ | Trichloroacetic acid | Methylene chloride. |
| VI | $ZnCl_2$ | Benzyl chloride | Chlorobenzene. |
| VII | $FeCl_3$ | Hydrogen chloride | Methyl chloride. |
| VIII | $BiCl_3$ | t-Butyl bromide | Acetaldehyde. |
| IX | $TiCl_4$ | Trichloroacetic acid | Isopropyl alcohol. |
| X | $AlBr_3$ | Hydrogen bromide | Methanol. |
| XI | $SnCl_4$ | Hydrogen chloride | Ethanol. |
| XII | $(i-C_4H_9)AlCl_2$ | t-Butyl chloride | Amyl alcohol. |

Other specific systems which may be treated by the process of this invention may include:

a. The polymer gel formed as by-product during the chlorination at $20°$ C. and 15 psig for 30 minutes of a butyl rubber (having a $\overline{M}v$ of 460,000) in hexane solvent.

b. The polymer gel formed as by-product during the polymerization of a butyl rubber containing 1.5 mole percent isoprene and 0.2 mole percent divinylbenzene in methyl chloride diluent at $-145°$ F., etc.

Although this invention has been illustrated by reference to specific embodiments, it will be apparent to those skilled in the art that various changes and modifications may be made which clearly fall within the scope of this invention.

What is claimed is:

1. A method of removing butyl rubber gel from process equipment used in the production of butyl rubber which comprises:
   a. contacting said gel with a hydrocarbon or hydrocarbon halide solution of a Lewis acid catalyst selected from the group consisting of $R_aMX_b$, wherein M is a metal of Groups IIIA and IVA of the Periodic Table having a valence of $a + b$, X is a halogen and R is a hydrocarbon radical, $M'Y_b$ wherein M' is a metal of Groups IVA and IVB of the Periodic Table, $b$ is the valance of said metal and Y is halogen and $AX_c$ wherein A is boron or phosphorus, X is halogen and $c$ is the valence of boron or phosphorus, and a Lewis salt cocatalyst selected from the group consisting of hydrocarbon halides, hydrogen halides, and organic acids, thereby solubilizing at least a portion of the said gel and forming a sludge;
   b. separating said solution containing said soluble portion of said gel from said sludge;
   c. contacting said sludge with a polar solvent to dissolve said sludge, and
   d. withdrawing said polar solvent solution.

2. A method as in claim 1 wherein the Lewis acid catalyst is $R_aMx_b$.

3. A method as in claim 1 wherein the Lewis acid catalyst is $M'Y_b$.

4. A method as in claim 1 wherein the Lewis acid catalyst is a halide of boron or phosphorus.

5. A method as in claim 2 wherein the Lewis acid catalyst is an alkyl aluminum halide.

6. A method as in claim 1 wherein the Lewis salt cocatalyst is hydrocarbon halide.

7. A method as in claim 6 wherein the hydrocarbon halide is an alkyl or aryl chloride.

8. A method as in claim 1 wherein the polar solvent is an oxygenated hydrocarbon.

9. A method as in claim 8 wherein the oxygenated hydrocarbon is an alcohol.

10. A method as in claim 5 wherein the Lewis acid catalyst is diethyl aluminum chloride.

11. A method as in claim 5 wherein the alkyl aluminum halide is ethyl aluminum dichloride.

12. A method as in claim 1 wherein the catalyst and cocatalyst are dissolved in a hydrocarbon.

13. A method as in claim 1 wherein the catalyst and cocatalyst are dissolved in a hydrocarbon halide.

14. A method of removing butyl rubber gel from process equipment used in the production of butyl rubber which comprises:
   a. contacting said gel with a hexane solution of ethyl-aluminum dichloride and benzyl chloride thereby solubilizing at least a portion of the said gel and forming a sludge,
   b. separating said hexane solution of gel from said sludge,
   c. contacting said sludge with ethyl alcohol to dissolve the said sludge, and
   d. withdrawing said ethyl alcohol sludge solution from the process equipment.

* * * * *